(12) United States Patent
Yamakado (10) Patent No.: US 7,561,307 B2
(45) Date of Patent: Jul. 14, 2009

(54) IMAGE PROCESSING METHOD AND DEVICE USING DITHER MATRIXES WITH SIZE AND DENSITY BEING INVERSELY RELATED TO A UNIT IMAGES DISTANCE TO THE CENTER OF THE DITHER MATRIX

(75) Inventor: Hitoshi Yamakado, Hino (JP)

(73) Assignee: Seiko Epson Corporation (JP)

( * ) Notice: Subject to any disclaimer, the term of this patent is extended or adjusted under 35 U.S.C. 154(b) by 534 days.

(21) Appl. No.: 11/339,709

(22) Filed: Jan. 25, 2006

(65) Prior Publication Data

US 2006/0181739 A1  Aug. 17, 2006

(30) Foreign Application Priority Data

Feb. 14, 2005  (JP)  ............................. 2005-035647

(51) Int. Cl.
*H04N 1/405* (2006.01)
(52) U.S. Cl. ...................... 358/3.1; 358/1.9; 358/3.02; 358/3.06; 358/3.09; 358/3.12
(58) Field of Classification Search .................. 358/1.9, 358/3.01, 3.02, 3.06, 3.09, 3.12
See application file for complete search history.

(56) References Cited

U.S. PATENT DOCUMENTS

| 5,440,360 | A | * | 8/1995 | Torrey et al. | ................ | 351/239 |
| 5,533,150 | A | * | 7/1996 | Zulian | ........................ | 382/275 |
| 5,920,682 | A | * | 7/1999 | Shu et al. | ...................... | 358/1.9 |
| 6,031,627 | A | * | 2/2000 | Kakutani | .................... | 358/1.9 |
| 6,128,099 | A | * | 10/2000 | Delabastita | ................ | 358/1.9 |
| 6,714,320 | B1 | | 3/2004 | Nakahara et al. | | |
| 2004/0017415 | A1 | | 1/2004 | Nunokawa | | |
| 2005/0179949 | A1 | | 8/2005 | Hagai | | |
| 2005/0200905 | A1 | | 9/2005 | Kimura | | |

FOREIGN PATENT DOCUMENTS

EP  0 835 025  4/1998

(Continued)

OTHER PUBLICATIONS

Search Report for related International Application No. PCT/JP2006/301987.

*Primary Examiner*—Twyler L Haskins
*Assistant Examiner*—Christopher W Mutz
(74) *Attorney, Agent, or Firm*—Harness, Dickey & Pierce, P.L.C.

(57) ABSTRACT

An image processor includes: memory storing data including pixel values; memory storing dither matrixes corresponding to dot size and having cells with individual threshold values; a generator generating quantized data including dots corresponding to cells by comparing the data with a dither matrix, and showing that a given sized dot is formed; a calculator calculating a duty ratio of first sized dots to second sized dots based on quantized data; a determining unit determining whether the duty ratio satisfies a predetermined condition; and a threshold updater updating the dither matrixes if the condition is satisfied, at least one update being based on duty ratio; the threshold values being to: form larger dots around the dither matrix center; decrease dot size as a distance between a cell and the dither matrix center increases; and decrease dot density as the distance between a cell and the dither matrix center increases.

7 Claims, 7 Drawing Sheets

▩ L SIZE DOT
▦ M SIZE DOT
⋮⋮ S SIZE DOT (a) LOW DENSITY (b) MEDIUM DENSITY (c) HIGH DENSITY

FOREIGN PATENT DOCUMENTS

| | | |
|---|---|---|
| JP | 04-286463 | 10/1992 |
| JP | 09-107473 | 4/1997 |
| JP | 10-157167 | 6/1998 |
| JP | 2000-177150 | 6/2000 |
| JP | 2000-350026 | 12/2000 |
| JP | 2001-177722 | 6/2001 |
| JP | 2004-017546 | 1/2004 |
| JP | 2004-363938 | 12/2004 |

\* cited by examiner

(c) HIGH DENSITY (b) MEDIUM DENSITY (a) LOW DENSITY

L SIZE DOT
M SIZE DOT
S SIZE DOT

IMAGE PROCESSING METHOD AND DEVICE USING DITHER MATRIXES WITH SIZE AND DENSITY BEING INVERSELY RELATED TO A UNIT IMAGES DISTANCE TO THE CENTER OF THE DITHER MATRIX

The entire disclosure of Japanese Patent Application No. 2005-035647, filed on Feb. 14, 2005 is expressly incorporated by reference herein.

BACKGROUND

1. Technical Field

The present invention relates to image processing for binarization using a clustered dither. Specifically, the invention relates to image processing capable of improving granularity of an image formed on a print media.

2. Related Art

An image forming device having ink ejecting mechanism, such as an ink jet printer, has a plurality of nozzles for ejecting an ink dot in a droplet form, in order to perform high-speed printing. The nozzles are mounted on a printing head. An ink jet printer causes the printing heads to eject ink dots by moving a sheet of paper (or a print media) in a sheet feeding direction and moving the printing heads repeatedly in a direction orthogonal to the sheet feeding direction, thereby forms images on the paper. This kind of printer is referred to as a "multi-pass printer".

The printing speed of a multi-pass printer is restricted since the multi-pass printer needs a two-directional scan. Therefore, an improvement in printing speed is required.

Reducing the scan dimension into a one-dimensional scan, for example, scanning only in a sheet feeding direction, referred to as single-pass printing, is one of the approaches to improve printing speed. It is necessary for single-pass printing to extend the size of a printing head greater than the width of the printing paper. This kind of printer, in other words, a printer having a printing head which is larger than the width of printing paper, is referred to as a "line head printer". In a printing head of a line head printer, it is necessary to layout nozzles at a regular distance from each other on the printing head. However, it is difficult to fabricate a printing head in which the nozzles are laid out at exact intervals, because of fabrication errors.

The dispersion of a distance between two adjacent nozzles causes the actual position of an ink dot formed on printing paper to be different from an ideal position. Furthermore, a skew of a nozzle also causes the actual position of an ink dot formed on printing paper to be different from an ideal position. The phenomenon of causing a difference between the ideal position and the actual position, is called "splash bending". In a single-pass printer such as a line head printer, the phenomenon of splash bending causes white bands or dark bands to appear on the print product. The white band appears where a distance between two adjacent nozzles is greater than the ideal distance, and the dark band appears where a distance between two adjacent nozzles is less than the ideal distance. This phenomenon is referred to as "banding".

To prevent deterioration in image quality, some technologies have been developed. For example, JP-A-9-107473 discloses a "clustered dither" as a binarization algorithm. Furthermore, JP-A-2001-177722 discloses an image processing that is a combination of an error diffusion method and a dither method. According to JP-A-2001-177722, concentrated dots are formed in low and medium density, and dispersed dots are formed around the concentrated dots in high density.

Some ink jet printers can control a dot radius of an ink dot ejected by a nozzle, in other words, a dot size of an ink dot formed on the printing paper. In an ink jet printer capable of ejecting an ink dot whose size is either one of the sizes S, M, and L, the image quality is dependent on an algorithm for generating an ink dot having one of the three sizes, in other words, an algorithm for determining where a dot is to be formed and which size of dot is to be formed. JP-A-2001-177722 has a problem in that the granularity of the image deteriorates because the concentrated dots are generated in low and medium density. A further drawback in JP-A-2001-177722 is that, it discloses a method of image processing performed only with single-size ink dots, and not a multi-size ink dot.

SUMMARY

An advantage of some aspects of the invention is to improve the granularity of an image formed by an image forming device by using an image processing device. The image forming device has an ink dot ejecting system capable of controlling a dot size of an ink dot. The image processing device performs image processing using a clustered dither.

According to an aspect of the invention, an image processing device comprises: an image memory that is adapted to store image data, the image data including a plurality of pixels, the image data including a pixel value of each pixel; a threshold memory that is adapted to store a plurality of dither matrixes, each of the plurality of dither matrix having a plurality of cells, each of the plurality of cells having a threshold value, each of the dither matrix corresponding to a dot size; a first generator that is adapted to generate quantized data by comparing the image data with one of a plurality of dither matrixes, the quantized data including a plurality of dots, each of the plurality of dots corresponding to one of a plurality of cells, each of the plurality of dots showing a dot having one of a plurality of dot sizes is formed; a calculator that is adapted to calculate a duty ratio on the basis of the quantized data, the duty ratio showing a ratio of a number of formed dots having a dot size to formed dots having another dot size; a determining unit that is adapted to determine whether the duty ratio satisfies a predetermined condition; and a threshold updater that is adapted to update at least one of a plurality of the dither matrixes in a case that the determining unit determines that the duty ratio satisfies the predetermined condition, at least one of the plurality of the dither matrixes being updated on the basis of the duty ratio; wherein the plurality of dither matrixes include threshold values to form dots under the following conditions: (1) around the center of the dither matrix, dots having larger dot size are formed; (2) the longer a distance between a cell and the center of the dither matrix is, the smaller a dot size is; and (3) the longer a distance between a cell and the center of the dither matrix is, the smaller a density of a dot to be formed is.

It is preferable that the image processing device further comprises an image reduction unit that is adapted to reduce the size of the image data; the first generator generates a quantized data for the image data whose size is reduced by the image reduction unit; and the image processing device further comprises a second generator that is adapted to generate quantized data by comparing the image data with the dither matrix updated by the threshold updater, the quantized data including a plurality of dots, each of the plurality of dots corresponding to one of a plurality of cells, each of the plurality of dots showing a dot having one of a plurality of dot sizes.

It is preferable that the predetermined condition is a condition where the greater the dot size is, the greater the duty ratio is.

It is preferable that the dither matrix is an m×m dot matrix or an m×n dot matrix, either of m and n being a positive integer.

According to another aspect of the invention, an ink jet printer comprises the above described image forming device.

According to a further aspect of the invention, an image processing method comprises: storing image data, the image data including a plurality of pixels, the image data including a pixel value of each pixel; storing a plurality of dither matrixes, each of the plurality of dither matrix having a plurality of cells, each of the plurality of cells having a threshold value, each of the dither matrix corresponding to a dot size; generating quantized data by comparing the image data with one of a plurality of dither matrixes, the quantized data including a plurality of dots, each of the plurality of dots corresponding to one of a plurality of cells, each of the plurality of dots showing a dot having one of a plurality of dot sizes is formed; calculating a duty ratio on the basis of the quantized data, the duty ratio showing a ratio of a number of formed dots having a dot size to formed dots having another dot size; determining whether the duty ratio satisfies a predetermined condition; and updating at least one of a plurality of the dither matrixes in a case that the determining unit determines that the duty ratio satisfies the predetermined condition, at least one of the plurality of the dither matrixes being updated on the basis of the duty ratio; wherein the plurality of dither matrixes include threshold values to form dots under the following conditions: (1) around the center of the dither matrix, dots having larger dot size are formed; (2) the longer a distance between a cell and the center of the dither matrix is, the smaller a dot size is; and (3) the longer a distance between a cell and the center of the dither matrix is, the smaller a density of a dot to be formed is.

According to a still further aspect of the invention, an computer program product causes a computer device to execute the above described image processing method.

According to a still further aspect of the invention, A print product, comprising: a plurality of dot matrixes, each of the plurality of the dot matrixes having a plurality of dots, each of the plurality of dots having a dot size; wherein the plurality of dots satisfy the following conditions: (1) the longer a distance between a dot and the center of the dot matrix is, the smaller a dot size is; and (2) the longer a distance between a dot and the center of the dot matrix is, the smaller a density of a dot to be formed is.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Figure 1:
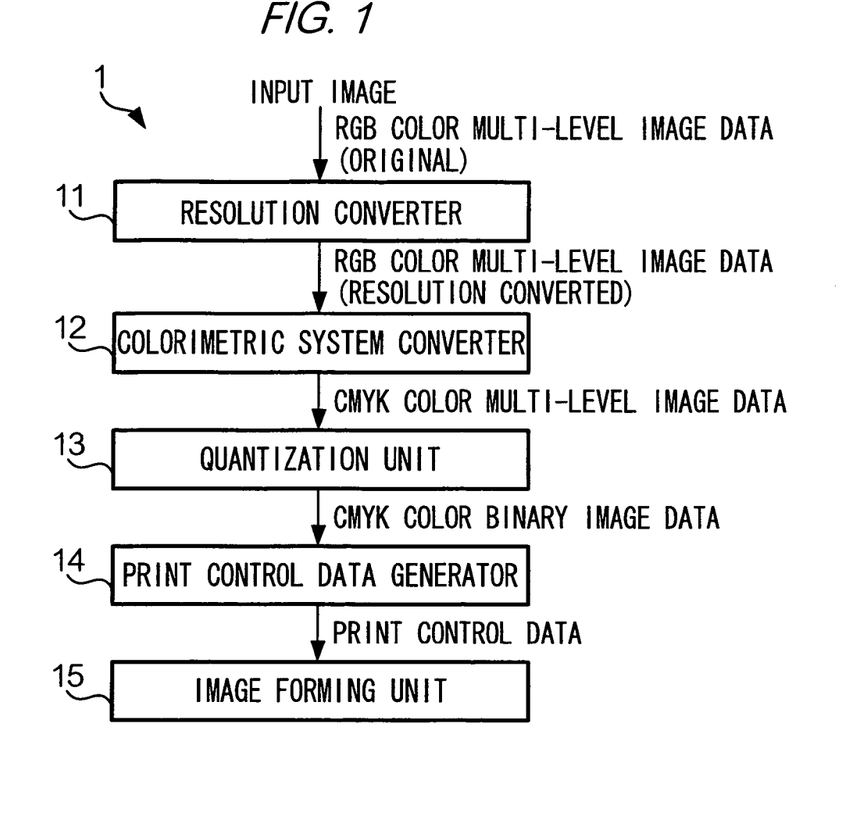
FIG. 1 shows a block diagram illustrating a functional configuration of image forming device 1.

FIG. 1 shows a block diagram illustrating a functional configuration of image forming device 1 in accordance with the first embodiment. Image forming device 1 is a device that converts input image data into print control data, and prints an image in accordance with the print control data. In the present embodiment, the image data includes multilevel data in RGB (Red, Green, and Blue) system. Furthermore, the print control data corresponds to binary data in CMYK (Cyan, Magenta, Yellow, and Black) system. Resolution converter 11 converts a resolution of input image data into a resolution conforming with that of image forming device 1. Colorimetric system converter 12 converts RGB image data into CMYK image data. Quantization unit 13 converts multi-level CMYK image data into binary CMYK image data. Print control data generator 14 generates print control data on the basis of binary CMYK data. The print control data is data for controlling ejection of an ink dot from a nozzle. Image forming unit 15 performs print operation in accordance with the print control data.

Figure 2:
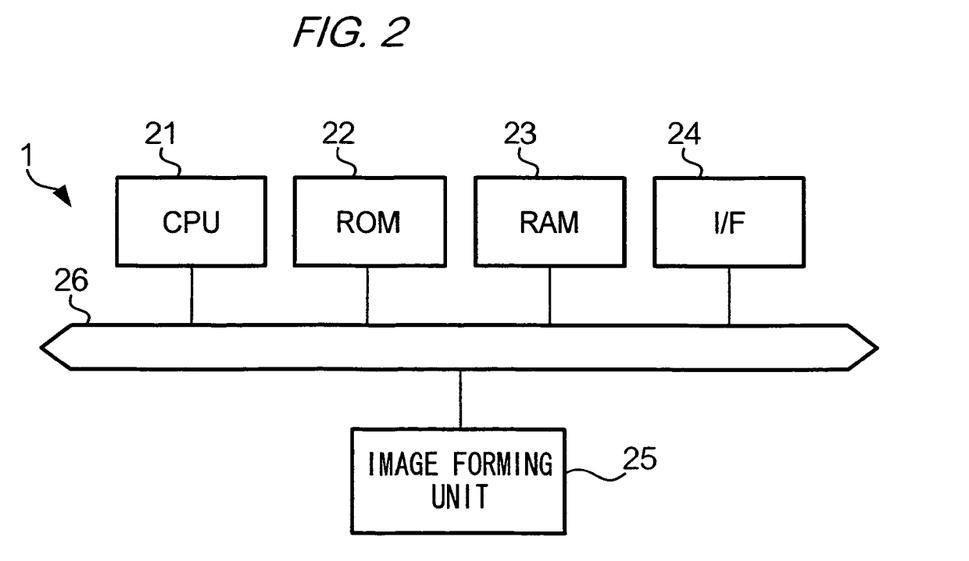
FIG. 2 shows a block diagram illustrating a hardware configuration of image forming device 1.

FIG. 2 shows a block diagram illustrating a hardware configuration of image forming device 1. In the present embodiment, image forming device 1 is a line head type ink jet printer. CPU (Central Processing Unit) 21 reads and executes a printing program stored in ROM (Read Only Memory) 22. RAM (Random Access Memory) 23 functions as a work area for CPU 21 in executing a program. I/F 24 is an interface for communicating data or a control signal with another device. For example, image forming device 1 can receive image data from an electronic device such as a personal computer (hereinafter referred to as "PC") or a digital camera, via I/F 24. RAM 23 also stores data received via I/F 24. Image forming unit 25 has a plurality of nozzles, a nozzle driver circuit, and a sheet feeding system (not shown in the figures). Image forming unit 25 prints an image in accordance with print control data under the control of CPU 21. The above described elements are mutually connected via bus 26. By CPU 21 executing a printing program, image forming device 1 has functions shown in FIG. 1.

Figure 3:
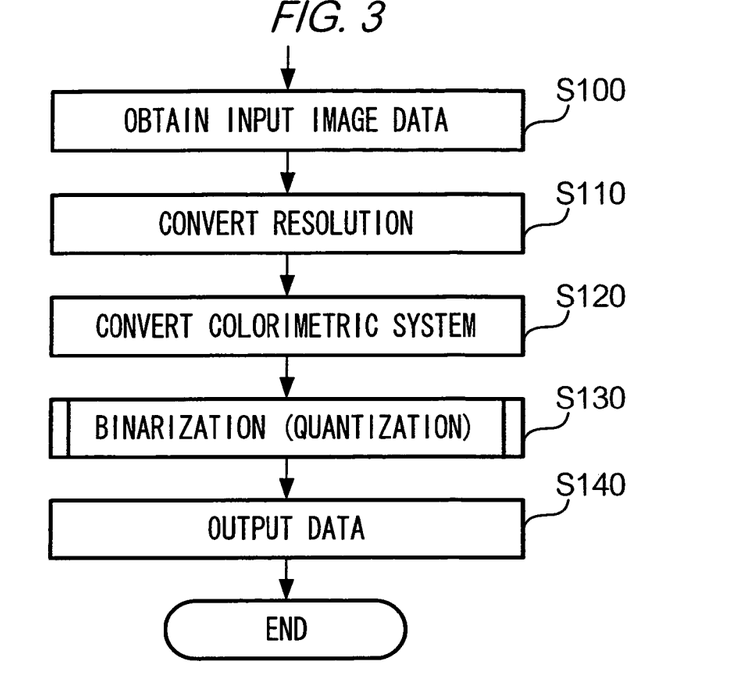
FIG. 3 shows a flow chart illustrating an operation of image forming device 1.

FIG. 3 shows a flow chart illustrating an operation of image forming device 1. When power is supplied to image forming device 1 by a power supply (not shown in the figures), CPU 21 reads and executes a printing program stored in ROM 22. By executing the printing program, CPU 21 is in standby state for inputting image data. When receiving image data via I/F 24, CPU 21 stores in RAM 23 the input image data in step S100. In the present embodiment, input image data is RGB multilevel image data. Image forming device 1 is an ink jet printer printing an image with a four color ink, CMYK. Image forming device 1 needs to convert a colorimetric system of input image data from an RGB system into a CMYK system. Furthermore, a nozzle of image forming device 1 can eject an ink dot whose size is one of S, M, or L. In other words, image forming device 1 can represent a four-level gradation of an ink dot, namely, no-dot, S/M/L size dot. In image forming device 1, a pixel of input image corresponds to an m×m dot matrix. The dot matrix is referred to as "unit image". Gradation of a pixel is represented by a number and size of dots formed in the dot matrix. Input image data needs to be converted into data indicating an ON/OFF state of a dot for each dot size. As will be described later, a resolution of input image data needs to be converted into a resolution corresponding to the number of the nozzles. Furthermore, the input image data needs to be converted from multi-level data into binary (or quantized) data indicating an ON/OFF state of a dot. It is to be noted that, in this specification, an "ON state of a dot" means ejecting an ink dot from a nozzle. Similarly, an "OFF state of a dot" means not ejecting an ink dot from a nozzle. For example, the phrase "data indicating an ON/OFF state of a dot" means data indicating whether a nozzle ejects an ink dot. Furthermore, the terms, "dot" or "ink dot" also mean an image formed on printing paper by an ink droplet, and further mean a unit of data for ejecting an ink dot.

Next, CPU 21 obtains the resolution of the input image data. In a case that the resolution of the input image data is different from that of image forming device 1, CPU 21 converts in step S110 the resolution of the input image data into a resolution conforming to image forming device 1. CPU 21 stores the resolution-converted image data in RAM 23. Next, in step S120, CPU 21 converts the colorimetric system of the image data from an RGB-system into a CMYK-system, in order to conform to the colorimetric system of image forming device 1. Next, in step S130, CPU 21 performs binarization (or quantization) of the colorimetric-system-converted image data. Details of the binarization will be described later.

Figure 4:
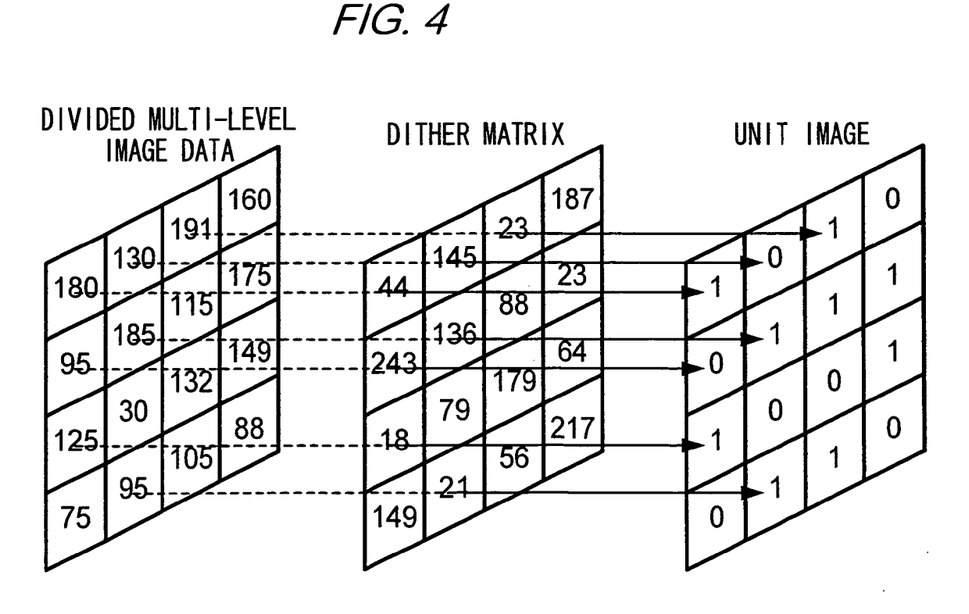
FIG. 4 illustrates an outline of the binarization with dither matrix method.

FIG. 4 illustrates an outline of the binarization with dither matrix method. RAM 23 or ROM 22 stores a dither matrix having a predetermined size of 4×4 cells as shown in FIG. 4. Here, a dither matrix includes a plurality of cells; each of the cells having a threshold value. CPU 21 divides the multi-level image data into a plurality of divided images. A divided image comprises a plurality of pixels. Each divided image, in this case, has the same size of pixels as the 4×4 cells of a dither matrix. In the present embodiment, a divided area corresponds to a unit image of a printed image (or binarized image data). A printed image comprises a plurality of unit images. In other words, a unit image of a printed image is formed by m×m dots (m=4 in this case). For each of the divided images, CPU 21 compares a pixel value of a target pixel of the divided image with a threshold value of a corresponding cell of the dither matrix. In other words, a pixel value of the target pixel is compared with a threshold value. Here, a target pixel is a pixel to be processed. In a case that the pixel value is greater than the threshold value, a target dot is determined as "ON". Here, a target dot is a dot to be processed. A target dot corresponds to a target pixel. In this specification, a "pixel" means a smallest unit of image data before binarization, and a "dot" means a smallest unit of image data after binarization. On the contrary, in a case that the pixel value is smaller than the threshold value, the target dot is determined as "OFF". For example, in FIG. 4, a pixel value of the left-top pixel is "180", and the corresponding threshold value in the dither matrix is "44". In this case, the pixel value is greater than the corresponding threshold value. Therefore, the binarized pixel value (in other words, a dot value of a target dot) is determined as "ON". In binarized image data shown in FIG. 4, "1" shows an ON dot, and "0" shows an OFF dot. In the present embodiment, image forming device 1 has three dither matrixes, each of which corresponds to one of dot sizes S, M, and L. This is because image forming device 1 can eject three sizes of ink dots. Furthermore, image forming device 1 performs binarization for each of the four color components, CMYK.

Figure 5:
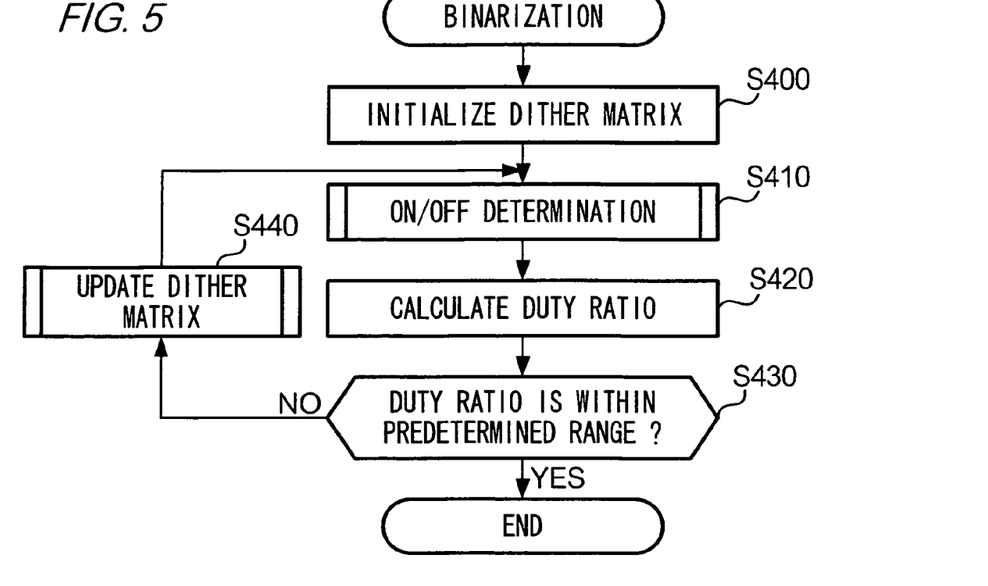
FIG. 5 shows a flow chart illustrating binarization in step S130.

FIG. 5 shows a flow chart illustrating binarization in step S130. In step S400, CPU 21 initializes a dither matrix. Detail of the initialization is as follows. ROM 22 stores in advance a plurality of initial dither matrixes, each of which corresponds to both: one of four color components and one of dot sizes. CPU 21 reads from ROM 22 an initial dither matrix corresponding to a color component that is a target color of the operation. Then, CPU 21 stores in RAM 23 the initial dither matrix.

Here, an initial dither matrix includes threshold values to form dots under the following conditions.

(1) Around the center of a unit image, larger sized dots are formed.
(2) The longer a distance between a target dot and the center of a unit image is, the smaller a dot size of the target dot is.
(3) The longer a distance between a target dot and the center of a unit image is, the smaller a density (or a number) of an ON dot is.

Figure 6:
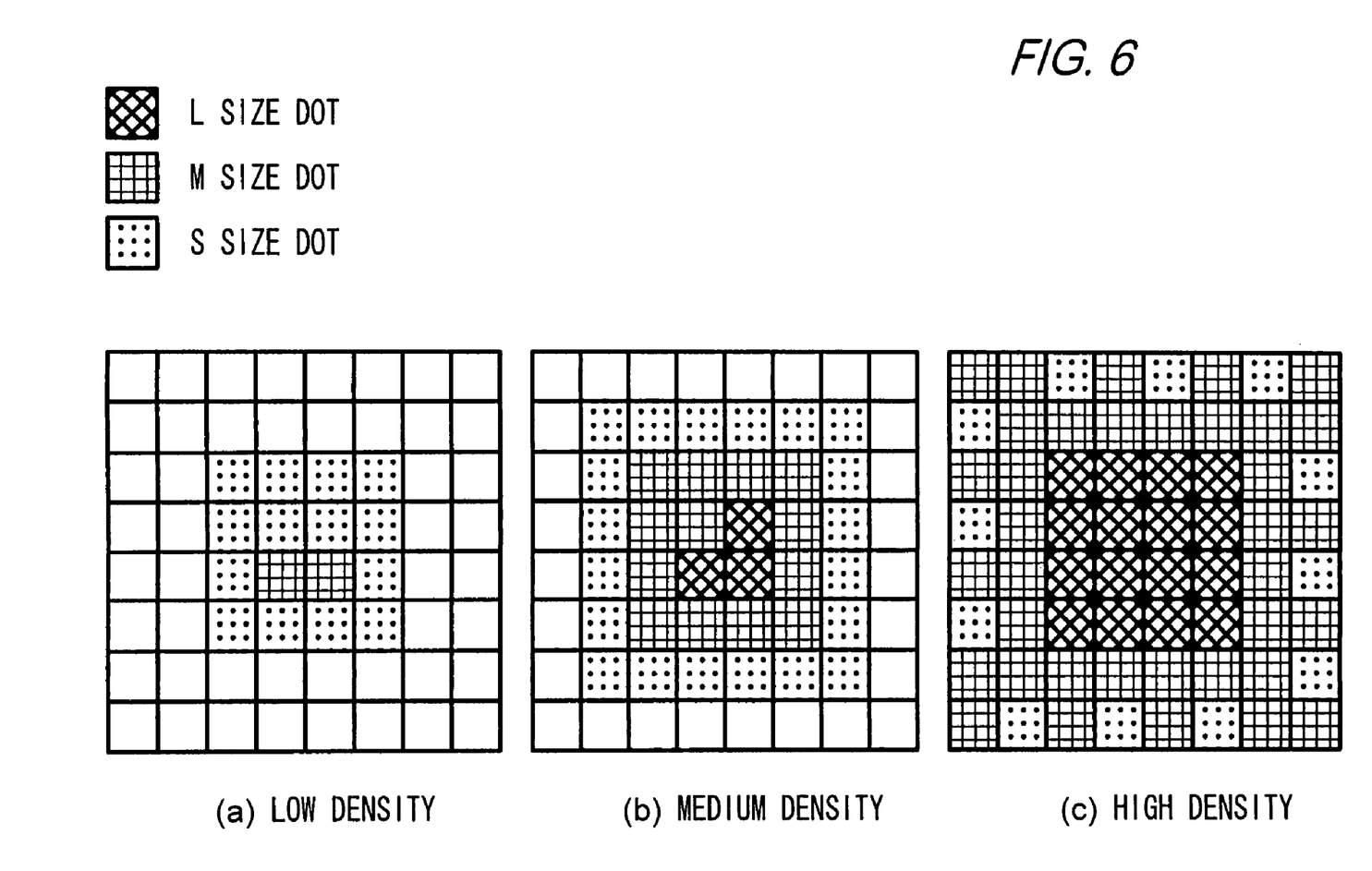
FIG. 6 shows examples of unit images, images after binarization.

FIG. 6 shows examples of unit images, images after binarization. Each of (a)-(c) in FIG. 6 shows a unit image having a size of 8×8 dots. As shown in FIG. 6, the larger dots are formed near the center of the unit image. Furthermore, a dot size gets correspondingly smaller as a distance between a dot and the center of the unit image becomes longer. According to the binarization with the dither matrix of the present embodiment, two adjacent unit images are connected by dots whose density is gradually increased or decreased. Therefore, dot concentration which results in granularity of an image is not conspicuous compared to methods of related art. Thus, the present embodiment provides a high quality image in view of granularity.

Referring to FIG. 5 again, in step S410, CPU 21 determines an ON/OFF state of a dot. On determining the ON/OFF state of a dot, CPU 21 compares a divided image with a corresponding dither matrix. CPU 21 reserves in RAM 23 a storage area of a unit image of a dot matrix for each dot size. Hereinafter, the dot matrix is also referred to as "dot ejection data". RAM 23 stores a plurality of dot ejection data. Each of the dot ejection data corresponds to a dot size. Initially, all dots included in dot ejection data are set as "0", showing that no dot is formed.

Figure 7:
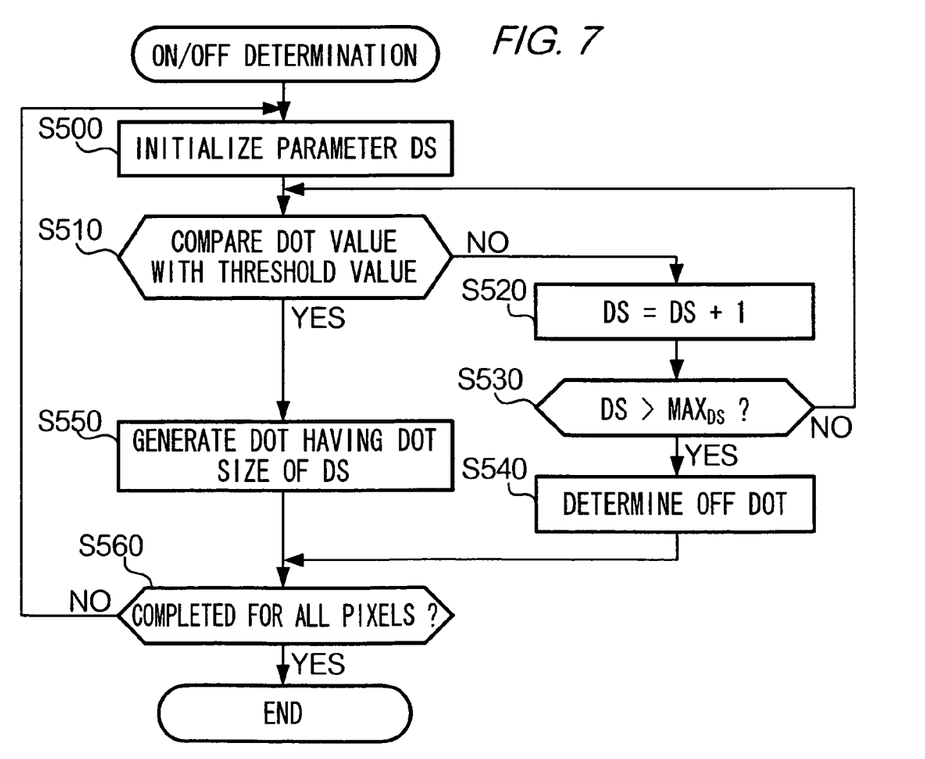
FIG. 7 shows a flow chart illustrating an ON/OFF determination in step S400.

FIG. 7 shows a flow chart illustrating an ON/OFF determination in step S400. In step S500, CPU 21 reserves in RAM 23 a storage area for parameter DS. The value of parameter DS is set to "1" as an initial value. Here, parameter DS is a parameter showing a dot size. In the present embodiment, a smaller value of DS represents a larger dot size. Furthermore, $MAX_{DS}$ shows a number of dot sizes that image forming device 1 can eject. In the present embodiment, $MAX_{DS}=3$ because image forming device 1 can eject dots of S, M, and L sizes.

Next, in step S510, CPU 21 compares a dot value of a target dot with a corresponding threshold value of a dither matrix. In a case that the dot value of the target pixel is greater than the corresponding threshold value (in step S510: YES), CPU 21 generates in step S550 data which shows that a dot having a dot size of DS is formed at the target pixel. In other words, CPU 21 updates a pixel value of a target pixel as "1" showing an ON state of a dot. On the contrary, in a case that the dot value of the target pixel is greater than the corresponding threshold value (in step S510: NO), CPU 21 updates in step S520 the parameter DS in accordance with a predetermined equation, DS=DS+1 in the present embodiment. Next, in step S530, CPU 21 determines whether parameter DS satisfies a predetermined condition, DS>$MAX_{DS}$. In a case that parameter DS satisfies DS>$MAX_{DS}$ (in step S530: YES), CPU 21 determines in step S540 that the target dot is an OFF dot. In other words, the pixel value of the target dot remains "0". In a case that parameter DS does not satisfy the equation DS>$MAX_{DS}$ (in step S530: NO), CPU 21 repeats the operations of steps S510-S520.

Next, in step S560, CPU 21 determines whether the ON/OFF determination is completed for all pixels of the multi-level image data. In a case that the ON/OFF determination is not completed for all pixels (in step S560: NO), CPU 21 repeats the operations of steps S500-S560 until the ON/OFF determination is completed for all pixels. In a case that the ON/OFF determination is not completed for all pixels (in step S560: NO), CPU 21 terminates the ON/OFF determination and proceeds to the operation in step S420 of FIG. 5.

Operations of image forming device 1 are described with reference to FIG. 5. In step S420, CPU 21 calculates a duty ratio of dots. Here, "duty ratio" of dots means a ratio of a number of dots having a particular dot size. Image forming device 1 can form dots of three sizes, S, M, and L. In the present embodiment, duty ratio $DUTY_{DS}$ is determined as $DUTY_{DS}$=(number of dots having a dot size DS)/(number of dots having a dot size DS+1). For example, in a case of DS=1, $DUTY_{DS}$=(number of L size dots)/(number of M size dots). CPU 21 calculates a duty ratio for all dot sizes, DS=1 through ($MAXS_{DS}$−1). CPU 21 stores in RAM 23 the calculated duty ratios.

Next, in step S430, CPU 21 determines whether the duty ratios are within a predetermined range. ROM 22 stores in advance a reference value of the duty ratio. For example, ROM 22 stores a minimum value $DUTY_{DS}^{MIN}$ and a maximum value $DUTY_{DS}^{MIN}$. CPU 21 compares for each dot size DS the calculated duty ratio $DUTY_{DS}$ with $DUTY_{DS}^{MIN}$ and $DUTY_{DS}^{MAX}$, thereby determining whether each of duty ratios $DUTY_{DS}$ satisfies the equation $DUTY_{DS}^{MIN} \leq DUTY_{DS} \leq DUTY_{DS}^{MAX}$. In a case that duty ratio $DUTY_{DS}$ satisfies the predetermined condition (in step S430: YES), CPU 21 terminates the binarization and proceeds to the operation in step S140 of FIG. 3. In a case that duty ratio does not satisfy the predetermined condition (in step S430: NO), CPU 21 updates in step S440 the corresponding dither matrix(es). Detail of the update is as follows.

Figure 8:
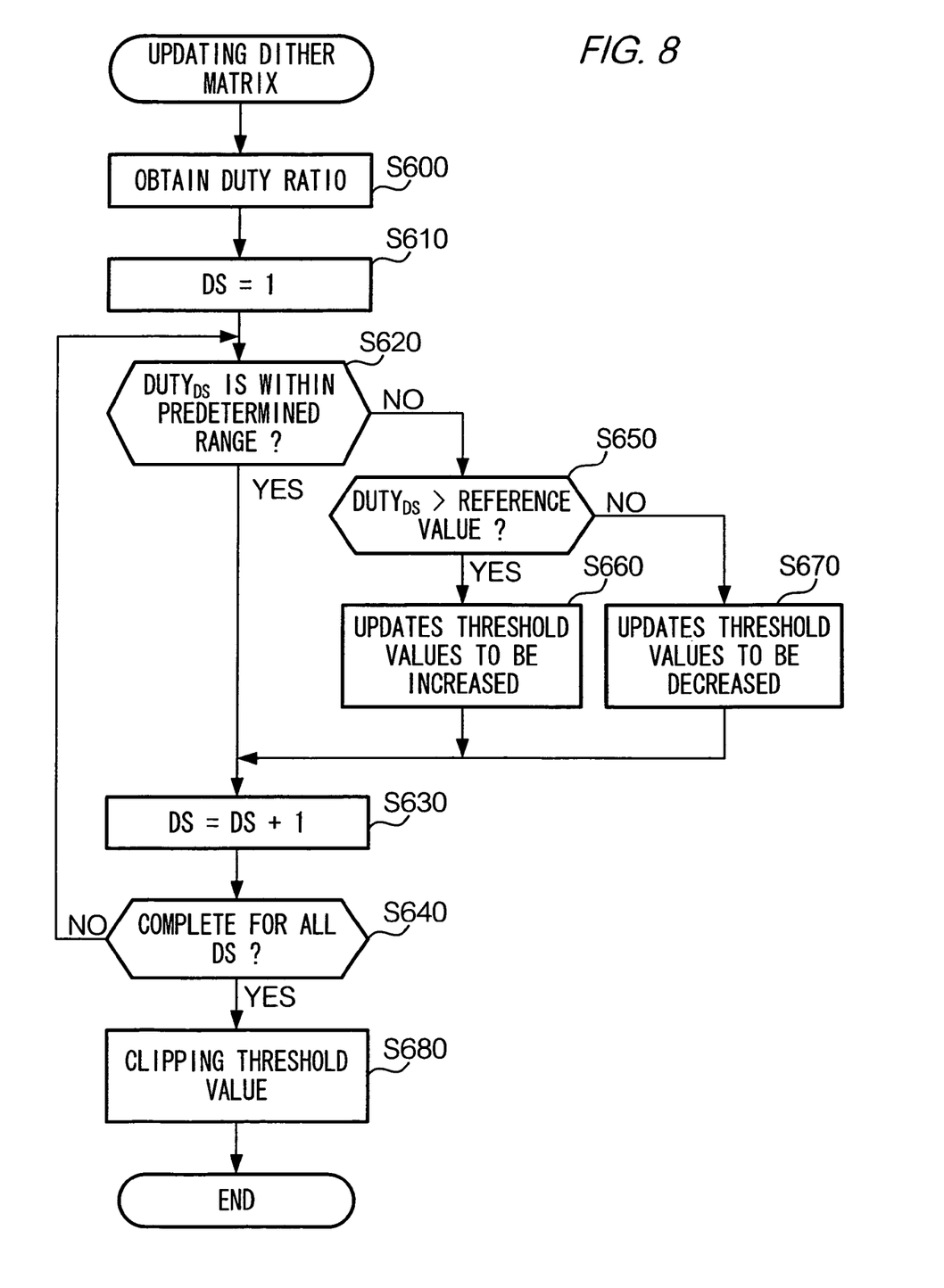
FIG. 8 shows a flow chart illustrating the update of the dither matrix in step S440.

FIG. 8 shows a flow chart illustrating the update of the dither matrix in step S440. In step S600, CPU 21 reads from RAM 23 duty ratios $DUTY_{DS}$, each of which corresponds to a value of DS. Next, in step S610, CPU 21 initializes parameter DS as DS=1. Next, in step S620, CPU 21 determines whether $DUTY_{DS}$ is within a predetermined range, similar to the operation in step S430. In a case that $DUTY_{DS}$ is within the predetermined range (in step S620: YES), CPU 21 updates in step S630 parameter DS in accordance with a predetermined equation, DS=DS+1 in this case. In step S640, CPU 21 determines that the operations are completed for all values of parameter DS. In other words, CPU 21 determines whether parameter DS satisfies a predetermined condition, DS>$MAX_{DS}$. In a case that the operations are not completed for all values of parameter DS (in step S640: NO), CPU 21 repeats the operations of steps S620-S630. In a case that the operations are completed for all values of parameter DS (in step S640: YES), CPU 21 proceeds to an operation in step S680.

In a case that CPU 21 determines duty ratio $DUTY_{DS}$ is not within the predetermined range (in step S620: NO), CPU 21 determines in step S650 whether duty ratio $DUTY_{DS}$ is greater than a corresponding reference value. For example, an average $DUTY_{DS}^{AVE}$, which is defined as $DUTY_{DS}^{AVE}$=(DU-$TY_{DS}^{MIN}$+$DUTY_{DS}^{MAX}$)/2, is employed as a reference value. Therefore, CPU 21 determines whether duty ratio $DUTY_{DS}$ satisfies $DUTY_{DS}$>$DUTY_{DS}^{AVE}$. In a case that duty ratio $DUTY_{DS}$ satisfies the condition (in step S650: YES), CPU 21 updates in step S660 threshold values in the dither matrix to be increased. On the contrary, in a case that duty ratio $DUTY_{DS}$ does not satisfy the condition (in step S650: NO), CPU 21 updates in step S670 threshold values in the dither matrix to be decreased. To increase the threshold value, CPU 21 can add a predetermined value to the threshold value. Alternatively, CPU 21 can multiply a predetermined value (the predetermined value is greater than 1) to the threshold value. Similarly, to decrease the threshold value, CPU 21 can subtract a predetermined value from the threshold value. Alternatively, CPU 21 can multiply a predetermined value (the predetermined value is less than 1) to the threshold value. It is to be noted that CPU 21 can employ in step S650 a reference value other than $DUTY_{DS}$. For example, CPU 21 may employ $DUTY_{DS}^{MIN}$ or $DUTY_{DS}^{MAX}$ as a reference value. Alternatively, CPU 21 may employ as a reference value another constant that is independent of $DUTY_{DS}^{MIN}$ and $DUTY_{DS}^{MAX}$.

Thus, the dither matrix is updated (or optimized) on the basis of the duty ratio. The reason for updating the dither matrix is as follows. It is known that increasing number of smaller sized dots provide a high quality image that satisfies human visual sense. However, for a single-pass printer such as a line head printer, increasing number of smaller sized dots causes banding to appear in a printed image. To prevent banding, it is preferable to form bigger sized dots around the center of a pixel of a printed image. Furthermore, to prevent deterioration in granularity of a printed image, it is preferable to form dots to satisfy the following conditions. (1) The longer a distance between a dot and the center is, the smaller a dot size of the dot is. (2) The longer a distance is between a dot and the center is, the smaller a density (or a number) of an ON dot is. Therefore, it is preferable to update a dither matrix so that the duty ratio of a larger sized dot becomes higher than the smaller one.

CPU 21 proceeds to an operation in steps S630 and S640, after the operation in step S660 and S670, respectively. In a case that the operations are completed for all values of parameter DS (in step S640: YES), CPU 21 performs clipping threshold values in a dither matrix to conform with the gradation range (0 through 255 in a case of 8 bit image data) of image forming device 1. For example, a threshold value below zero is updated as zero, and a threshold value above 255 is updated as 255. When the operation in step S680 is completed, CPU 21 proceeds to an operation in step S410 of FIG. 4.

Referring to FIG. 3 again, in step S140, CPU 21 outputs the binary image data to image forming unit 25 as nozzle control data. Image forming unit 25 controls a nozzle in accordance with the binary image data, thereby forming an image on a print media. It is to be noted that the binary image data may be converted into another kind of data, and the converted data may be output as nozzle control data. Image forming device 1 performs the operations described above.

2. Second Embodiment

Next, the second embodiment of the invention will be described in this section. In the first embodiment, the ON/OFF determination and the calculation of a duty ratio are performed for all of the input image data. Thus, the duty ratio is determined to be in a predetermined range. However, image forming device 1 in accordance with the first embodiment needs to perform an ON/OFF determination every time a dither matrix is updated. Therefore, image forming device 1 in accordance with the first embodiment has heavy load. The present embodiment relates to a image processing device capable of updating a dither matrix with light load.

Figure 9:
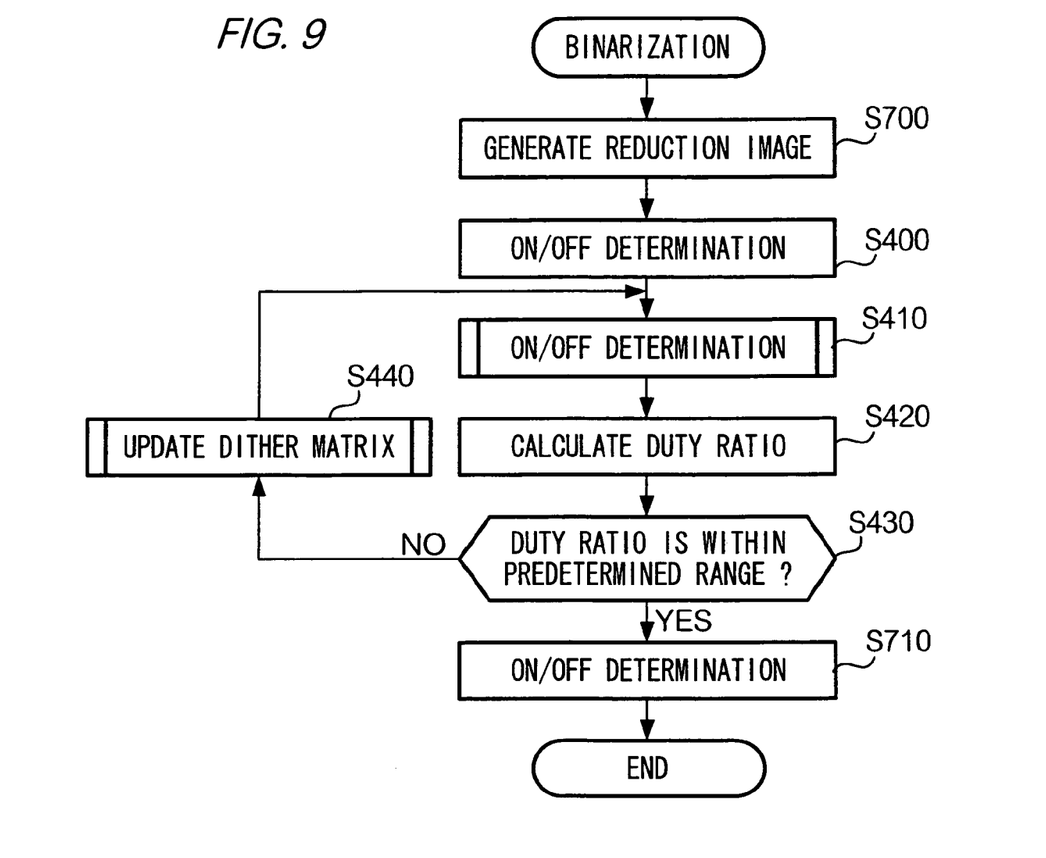
FIG. 9 shows a flow chart illustrating binarization in accordance with the second embodiment.

FIG. 9 shows a flow chart illustrating binarization in accordance with the second embodiment of the invention. In the second embodiment, most of the elements are the same as those of the first embodiment, except for binarization. Binarization shown in FIG. 9 is employed instead of binarization shown in FIG. 5. The same elements as the first embodiment are not described in the following description.

In step S700, CPU 21 generates a reduction image. A reduction image is an image generated by scaling an input image down. In other words, CPU 21 converts a resolution of the input image data into a predetermined resolution. The resolution after the conversion may be a predetermined number less than the input image data, for example, ¼ or ¹⁄₁₆ of the resolution of the input image. Alternatively, the image data after the conversion may have a predetermined size.

Next, CPU 21 performs operations same as the operations in steps S400-S440 of FIG. 5. Thus, a duty ratio is optimized for the reduction image. Although the reduction image is not the same as the input image, but the reduction image has the similar characteristics to the original input image. Therefore, the obtained duty ratio optimized for the reduction image is also optimized for the input image. CPU 21 performs in step S710 an ON/OFF determination by using the updated dither matrix, after completing the operations in steps S400-S440. Details of the ON/OFF determination are the same as the first embodiment, shown in FIG. 7.

3. Further Embodiments

The invention is not restricted to the above described embodiments. Various modification can be applied to the embodiments. For example, in the above embodiments, a single apparatus, image forming device 1, performs the operations in steps S100-S140. In another embodiment, a plurality of apparatus or a system may perform the operations.

Figure 10:
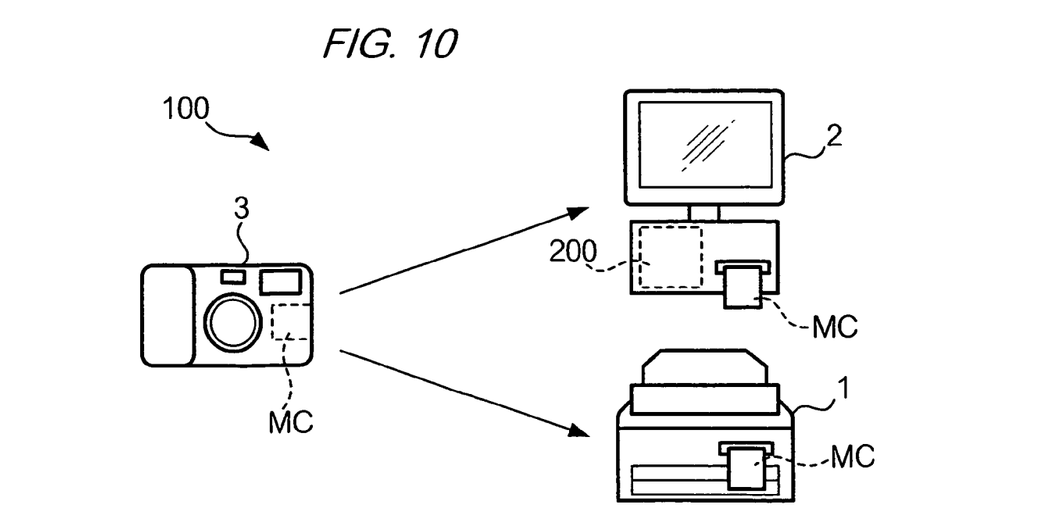
FIG. 10 shows an example of image forming system 100 in accordance with another embodiment.

FIG. 10 shows an example of image forming system 100 in accordance with another embodiment. Image forming device 1 is connected to PC 2 via wired or wireless network. Digital camera 3 is an image capturing device that stores an image in memory card MC. PC 2 has an interface for reading data from memory card MC. In image forming system 100, for example, PC 2 may function as image processing device 200 that performs all or a part of operations in steps S100-S140. Alternatively, image forming device 1 may read data from memory card MC, and may perform all or a part of operations in steps S100-S140.

In the present embodiments, image processing is performed in an order of resolution conversion, calorimetric system conversion, quantization, and rasterization. The order of the operation is not restrict to the embodiments. Image processing may be performed, for example, in an order of colorimetric system conversion, resolution conversion, quantization, and rasterization.

In another embodiment, calorimetric system conversion is not restricted to that from an RGB system into a CMYK system. For example, RGB image data may be converted into a seven-color system, black, cyan, magenta, yellow, light-cyan, light-magenta, and dark-yellow.

Yet in another embodiment, the embodiments may be applied to not only a line head printer but also to a multi-pass printer.

In the above embodiment, each of the shape of the divided image data, the dither matrix, and the unit image are a square having a size of m×m. The shape of the divided image data, the dither matrix, and the unit image may be, for example, a rectangle having a size of m×n.

Figure 11:
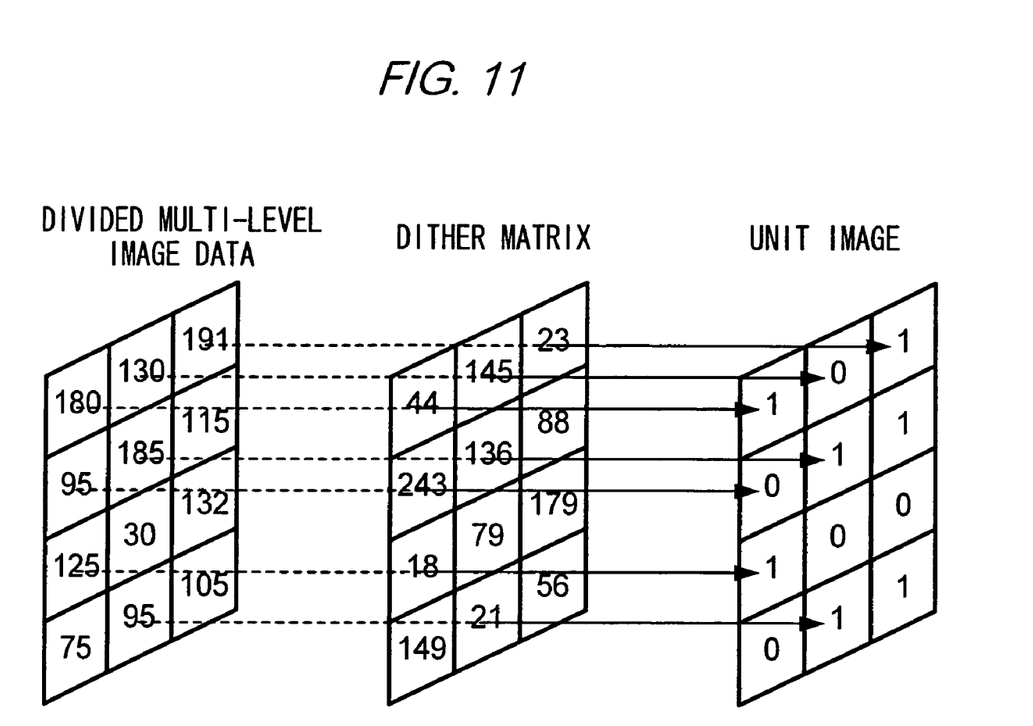
FIG. 11 illustrates an outline of the binarization with dither matrix method using a rectangular dot matrix.

FIG. 11 shows an example of the divided image data, the dither matrix, and the unit image having a size of m×n. In the example shown in FIG. 11, the size is 3×4.

What is claimed is:

1. An image processing device, comprising:
   an image memory that is adapted to store image data, the image data including a plurality of pixels, the image data including a pixel value of each pixel;
   a threshold memory that is adapted to store a plurality of dither matrixes, each of the plurality of dither matrix having a plurality of cells, each of the plurality of cells having a threshold value, each of the dither matrix corresponding to a dot size;
   a first generator that is adapted to generate quantized data by comparing the image data with one of a plurality of dither matrixes, the quantized data including a plurality of dots, each of the plurality of dots corresponding to one of a plurality of cells, each of the plurality of dots showing a dot having one of a plurality of dot sizes is formed;
   a calculator that is adapted to calculate a duty ratio on the basis of the quantized data, the duty ratio showing a ratio of a number of formed dots having a dot size to formed dots having another dot size;
   a determining unit that is adapted to determine whether the duty ratio satisfies a predetermined condition; and
   a threshold updater that is adapted to update at least one of a plurality of the dither matrixes in a case that the determining unit determines that the duty ratio satisfies the predetermined condition, at least one of the plurality of the dither matrixes being updated on the basis of the duty ratio;
   wherein the plurality of dither matrixes include threshold values to form dots under the following conditions: (1) around the center of the dither matrix, dots having larger dot size are formed; (2) the longer a distance between a cell and the center of the dither matrix is, the smaller a dot size is; and (3) the longer a distance between a cell and the center of the dither matrix is, the smaller a density of a dot to be formed is.

2. An image processing device according to claim 1, wherein:
   the image processing device further comprises an image reduction unit that is adapted to reduce the size of the image data;
   the first generator generates a quantized data for the image data whose size is reduced by the image reduction unit;
   the image processing device further comprises a second generator that is adapted to generate quantized data by comparing the image data with the dither matrix updated by the threshold updater, the quantized data including a plurality of dots, each of the plurality of dots corresponding to one of a plurality of cells, each of the plurality of dots showing a dot having one of a plurality of dot sizes.

3. An image processing device according to claim 1, wherein the predetermined condition is a condition where the greater the dot size is, the greater the duty ratio is.

4. An image processing device according to claim 1, wherein the dither matrix is an m×m dot matrix or an m×n dot matrix, either of m and n being a positive integer.

5. An ink jet printer, comprising an image forming device according to claim 1.

6. An image processing method, comprising:

storing image data, the image data including a plurality of pixels, the image data including a pixel value of each pixel;

storing a plurality of dither matrixes, each of the plurality of dither matrix having a plurality of cells, each of the plurality of cells having a threshold value, each of the dither matrix corresponding to a dot size;

generating quantized data by comparing the image data with one of a plurality of dither matrixes, the quantized data including a plurality of dots, each of the plurality of dots corresponding to one of a plurality of cells, each of the plurality of dots showing a dot having one of a plurality of dot sizes is formed;

calculating a duty ratio on the basis of the quantized data, the duty ratio showing a ratio of a number of formed dots having a dot size to formed dots having another dot size;

determining whether the duty ratio satisfies a predetermined condition; and updating at least one of a plurality of the dither matrixes in a case that the determining unit determines that the duty ratio satisfies the predetermined condition, at least one of the plurality of the dither matrixes being updated on the basis of the duty ratio;

wherein the plurality of dither matrixes include threshold values to form dots under the following conditions: (1) around the center of the dither matrix, dots having larger dot size are formed; (2) the longer a distance between a cell and the center of the dither matrix is, the smaller a dot size is; and (3) the longer a distance between a cell and the center of the dither matrix is, the smaller a density of a dot to be formed is.

7. A computer readable medium encoded with a data structure, causing a computer device to execute:

storing image data, the image data including a plurality of pixels, the image data including a pixel value of each pixel;

storing a plurality of dither matrixes, each of the plurality of dither matrix having a plurality of cells, each of the plurality of cells having a threshold value, each of the dither matrix corresponding to a dot size;

generating quantized data by comparing the image data with one of a plurality of dither matrixes, the quantized data including a plurality of dots, each of the plurality of dots corresponding to one of a plurality of cells, each of the plurality of dots showing a dot having one of a plurality of dot sizes is formed;

calculating a duty ratio on the basis of the quantized data, the duty ratio showing a ratio of a number of formed dots having a dot size to formed dots having another dot size;

determining whether the duty ratio satisfies a predetermined condition; and updating at least one of a plurality of the dither matrixes in a case that the determining unit determines that the duty ratio satisfies the predetermined condition, at least one of the plurality of the dither matrixes being updated on the basis of the duty ratio;

wherein the plurality of dither matrixes include threshold values to form dots under the following conditions: (1) around the center of the dither matrix, dots having larger dot size are formed; (2) the longer a distance between a cell and the center of the dither matrix is, the smaller a dot size is; and (3) the longer a distance between a cell and the center of the dither matrix is, the smaller a density of a dot to be formed is.

* * * * *